United States Patent [19]

Elhaus

[11] Patent Number: 4,776,741
[45] Date of Patent: Oct. 11, 1988

[54] STACKING DEVICE FOR STACKING ELONGATED GOODS

[76] Inventor: Friedrich W. Elhaus, Dorfstrasse 21, 7761 Moos, Fed. Rep. of Germany

[21] Appl. No.: 898,577

[22] Filed: Aug. 21, 1986

Related U.S. Application Data

[63] Continuation-in-part of Ser. No. 506,891, Jun. 22, 1983, abandoned.

[30] Foreign Application Priority Data

Jun. 23, 1982 [DE]  Fed. Rep. of Germany ....... 3223456
Aug. 30, 1982 [DE]  Fed. Rep. of Germany ....... 3232180

[51] Int. Cl.$^4$ ............................................ B65H 29/36
[52] U.S. Cl. ..................................... 414/77; 198/424; 271/189; 414/82
[58] Field of Search ............... 414/77, 82; 198/424; 271/189-192

[56]  References Cited
U.S. PATENT DOCUMENTS

| | | | |
|---|---|---|---|
| 2,323,174 | 6/1943 | Wikle | 414/77 X |
| 3,420,385 | 1/1969 | Verrinder | 414/77 X |
| 3,768,807 | 10/1973 | Spengler | 414/77 X |
| 3,912,253 | 10/1975 | Jarman | 271/190 X |
| 4,030,620 | 6/1977 | Euverard et al. | 414/77 X |

Primary Examiner—E. R. Kazenske
Assistant Examiner—Hien H. Phan
Attorney, Agent, or Firm—Willian Brinks Olds Hofer Gilson & Lione Ltd.

[57]   ABSTRACT

A stacking device for rigid elongated goods, such as metal bars, pipes, sectional materials, and the like, comprises a stacking section, in which at least one set of rollers for conveying the goods are provided. The rollers are arranged to extend with their axes horizontally and transversely underneath the goods for supporting and conveying the same and are adapted to be driven for linear movement selectively in and opposite to the conveying direction of the goods by means of linear drive chains, such that all the rollers may be removed from the stacking section in order to transfer the goods onto supports arranged at the stacking section under said rollers and adapted to be raised and lowered to take over the goods into a transportation frame. Moreover, the rollers may be driven by a rotation drive chain, while the linear drive chains stand still such that in a conveying mode the roller axes are kept at rest and the rollers are rotated about their axes to convey the goods. In a stacking mode the linear drive chains are moved and the rotation drive chains are kept at rest such that the rollers are removed under free rolling along the undersurface of the goods from the stacking section.

5 Claims, 4 Drawing Sheets

STACKING DEVICE FOR STACKING ELONGATED GOODS

CROSS REFERENCE TO RELATED APPLICATIONS

This application is a continuation-in-part application of earlier filed U.S. patent application, Ser. No. 06/506,891 filed June 22, 1983 now abandoned.

FIELD OF THE INVENTION

The invention relates generally to a stacking device for stacking elongated goods. More particularly, the invention relates to a stacking device for stacking elongated goods such as bars, pipes, sectional material, and the like, e.g. extruded light metal sections which are cut to desired lengths by a saw operating transversely of the sections, and thereafter feeded to the stacking device.

BACKGROUND OF THE INVENTION

Usually elongated goods such as extruded light metal sections are stacked for further processing in layers in transportation or annealing racks or frames, usually designed as side board pallets.

Optimum use of the transportation frames is made if the goods are stacked at the best possible compactness. Particularly the inner width of the frames should be fully utilized if possible.

Generally cutoff saws are used to divide the lengths as produced into the lengths for processing, and a cut-to-length device serves for adjusting the desired processing lengths at the cutoff saw.

The goods cut to processing lengths then normally are stacked by hand in layers in the transportation frames. This causes a heavy workload for the staff and often leads to production bottlenecks. On the other hand, however, stacking by hand frequently cannot be dispensed with for a variety of reasons.

Automatic stacking devices are known from U.S. Pat. Nos. to Cavenar (4,016,072), Lockhart (1,695,115), Benzing (3,267,782) and Obenshain (3,203,326), and from the German patent originating from Schulte and assigned to J. Banning A. G. (DE No. 812 537).

The patent to Cavenar discloses a cut-to-length station for cutting to length elongated goods having transportation means to convey the goods to stacking sections on both sides of the cut-to-length station. The transportation means comprise pick-off arms which may be lifted by air cylinders and thereby pivoted around pivot axes to kick the goods away from the transportation path to both sides thereof.

The patent to Lockhart discloses a rack-and-pinion conveyor mechanism which may be lifted by raising of longitudinally extending angle members which form a carriage movable on longitudinally extending tracks. A complicated device is provided to lift and lower the tracks by actuation of a rod.

The patent to Benzing provides for a stacking section for stacking sheets of paper and comprising a series of stacking sections. The sheets to be stacked are cut from continuous webs or the like and gripped and transported in the stacking section by means of a gripper delivery assembly. Thus, the cut sheets are not supported by rollers from below.

The patent to Obenshain, which as well provides a device for stacking sheets of paper, discloses feeding of the sheets to a stacking section by conveying the sheets over a collecting drum and subsequently over a transferring drum to a stack of sheets.

The patent to Schulte (German Pat. No. 812 537) is concerned with a stacking device for stacking of sheets or strips, e.g. made from metal. Along both side edges of a stacking section endless belts are arranged which are adapted to move a set of rollers along the conveying path in conveying direction. The roller axes are suspended vertically on brackets connected to the endless belts running parallel to and above the side edges of the stacking section. The rollers support the goods to be stacked by their radial back surfaces, which extend substantially in a horizontal plane. The brackets are swingable sidewardly out of the conveying path to allow a transfer of the goods to supports of the stacking section. The supports may be lowered to allow stacking of further goods and may be raised after removal of a stack of goods.

The last-mentioned known device is complicated in its design and does not allow for stacking of a package of slim elongated goods of a considerable width, because the vertically extending rollers are adapted to support solely the elongated goods situated in the areas adjacent the side edges of the stacking device, i.e. not over the whole width of the package.

SUMMARY OF THE INVENTION

It is an object of the invention to provide a stacking device for mechanically stacking packages of elongated goods, in particularly extruded metal sections of small sectional dimensions in transportation frames, such as side board pallets, at the best possible compactness of the stack in widthwise direction of the frames.

It is also an object of the invention to provide a stacking device which permits changeover from mechanical to manual operation, and vice versa, with minimal problems and without requiring any structural alteration.

It is a further object of the invention to provide a stacking device which allows for quick automatic stacking in an economical manner.

These and other objects are accomplished by a stacking device as disclosed herein.

In a preferred embodiment of the stacking device of the invention the goods to be stacked are supported and moved in the stacking section by rollers which extend transversely and horizontally under the elongated goods. The problem to stack the goods underneath the conveying path is accomplished by coupling both ends of the rollers to two parallel linear drive chains which are not endless chains but form a so-called "loose roller carpet". This loose roller carpet may be pulled away from under the goods by driving the chains in synchronism by means of chain sprockets and thereby gives way for the goods to rest and move downward on the lowerable supports of the stacking section.

The stacking device may be arranged in alignment with a feeding section directly adjoining a cutoff saw. This arrangement has the advantage that the operator of the saw is standing close to the stacking unit so that he may observe the mechanical stacking and intervene in case of disturbance, if necessary. Furthermore, this arrangement requires little space, is inexpensive, and characterized by a simple sequence of operations.

In other embodiments of the invention a cutting-to-length section may be provided in alignment with the feeding section between the stacking section and the cutoff saw. It comprises transportation means for the goods and a cut-to-length stop is arranged to be adjustable along the cutting-to-length section which also permits lateral discharge of the goods for manual stacking, the transportation means of the stacking section being driven.

In accordance with a preferred embodiment including the features mentioned above the cutting-to-length section and the stacking section are aligned and the cut-to-length stop is designed as a gate structure having a stop plate which is pivoted at the top of the gate and adapted to be swung upwardly for passage of the cut to length goods on to the stacking section.

Lateral stops of which at least one is adjustable, may be provided for lateral definition of the goods.

Rotating of the rollers of the stacking apparatus by means of rotation drive chains is particularly convenient. These chains may be driven in a conveying mode to rotate the rollers with their axes kept at rest in order to convey the goods onto the stacking section, whilst in a stacking mode, in which the linear drive chains remove the rollers out of the stacking section, the rotation drive chains are kept at rest such that the rollers are forced to roll along the rotation drive chains thereby holding the goods in a rest position at the stacking section.

In the stacking mode the time to clear the stacking section form the rollers may be halved or the surface cleared from the rollers may be doubled by making use of two aligned sets of rollers each being removable from the stacking section by its own pair of linear drive chains which may be driven in synchronism and in direction opposite to each other. In this case, however, only one set of rotation drive chains is necessary to rotationally drive both roller sets in a conveying mode in the same rotational direction.

Conventional side board pallets may be used as transportation frames. Yet they must be provided with openings in the bottom to permit passage into the stacking position of the supports which are adapted to be raised and lowered. The pallets may be movable on a carriage transversely of the direction of advance so that an empty pallet always will be ready when a preceding pallet is in stacking position under the loose roller carpet.

BRIEF DESCRIPTION OF THE DRAWINGS

In order that the invention may be clearly understood and readily carried into effect, several embodiments will now be described, by way of example, with reference to the accompanying drawings, in which.

DESCRIPTION OF THE PREFERRED EMBODIMENTS

Figure 1:
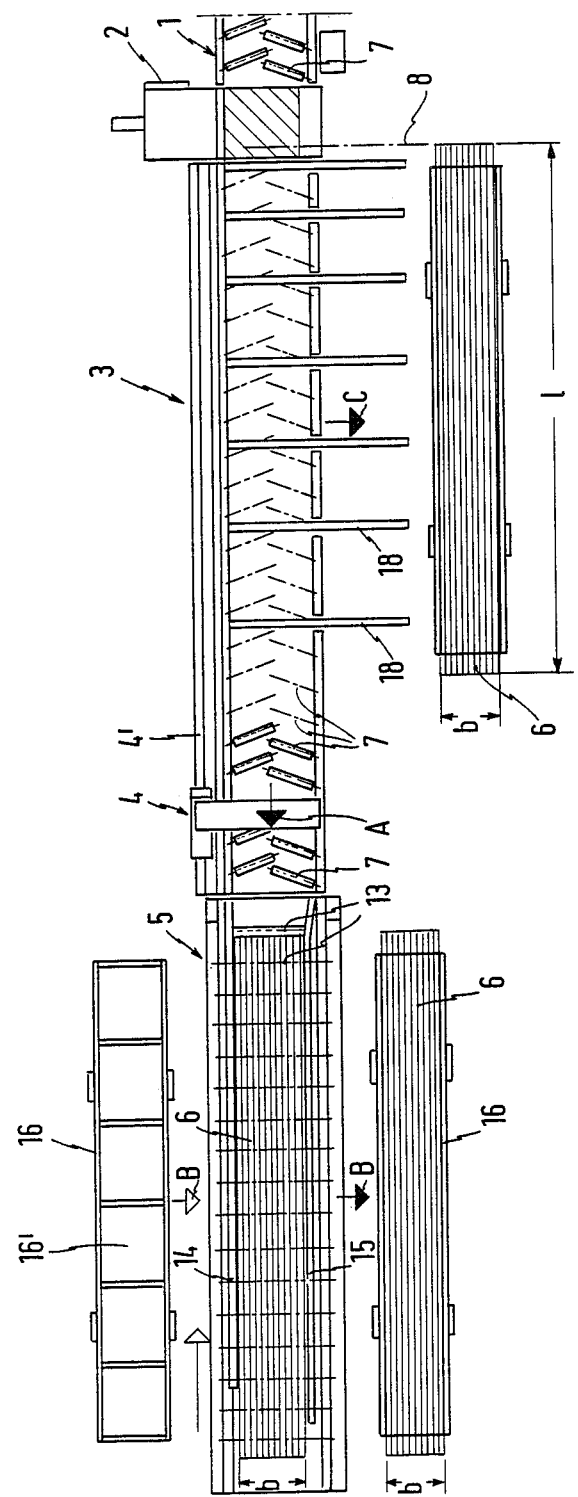
FIG. 1 is a top elevational view of an arrangement comprising a cutting-to-length section and a stacking section according to the invention arranged behind each other in the direction of advance of the goods and contiguous to a cut-to-length saw.

With the apparatus for cutting to length and stacking shown in FIG. 1, a feeding section 1 is followed by a cutoff saw 2 which in turn is followed in the direction of advance by a cutting-to-length section 3 along which a cut-to-length stop 4 is adjustable and which is followed by a stacking section 5.

The feeding section 1 for the elongated goods 6 as well as the cutting-to-length section 3 are furnished with driven diagonal rollers 7 which are disposed at an angle with respect to the direction of advance A. This arrangement causes compacting of the elongated goods 6 toward the center of the conveying path to a pile width b.

Once the goods supplied in the direction of advance A have moved up against the cut-to-length stop 4 which is adjusted to a desired processing length 1, the goods are cut by the cutoff saw 2 along the dash-dot line 8.

The cut-to-length stop 4 is designed to permit passage of the cut goods to the stacking section 5 under the conveying action of the diagonal rollers 7 in the cutting-to-length section 3.

In the stacking section 5 the goods are advanced by rollers 13 which are disposed underneath the advanced goods 6 and transversely of the direction of advance A, passing the goods between side stops 14, 15 of which at least one is adjustable laterally. In the stacking section 5 the rollers 13 are pulled away from under the goods, as will be explained in greater detail below with reference to FIGS. 2 to 4. The goods 6 thus will be lowered on supports which likewise will be described in greater detail below and which deposit the goods in layers or stack them in a transportation frame 16. FIG. 1 shows a transportation frame filled with goods 6 at the bottom and an empty transportation frame 16 at the top. The transportation frames are movable horizontally in the direction of arrow B in FIG. 1 and in opposite direction, i.e. transversely of the direction of advance A, from the empty position into the central loading position and the finished position.

While the goods are being stacked automatically in the stacking section 5, stacking by hand on a transportation frame 16 may be effected in the cutting-to-length section 3. To facilitate this work, transverse conveyors 18 may be provided which make it easier to remove the elongated goods from the conveying path and advance them toward the transportation frame 16 in the direction of arrow C.

In a simplified embodiment (not shown) a stacking section 5, as described with reference to FIG. 1, directly follows the cutoff saw 2. Here the cut-to-length stop 4 is associated with the stacking section 5 along which it is adjustable. In other words, there is no separate cutting-to-length section 3 with driven diagonal rollers and the cutting-to-length section in this case coincides with the stacking section 5.

Upon cutting to length the goods which have moved up against the cut-to-length stop 4 the stacking is fully automatic in stacking section 5, as with the embodiment shown in FIG. 1. However, if manual stacking is desired, the side stop 15 must be removed in order that the elongated goods 6 may be taken off in the direction of arrow B.

In this case a design of the cut-to-length stop 4 as a gate structure is not required. Instead a stop means having a fixed stop plate may be provided.

Figure 2:
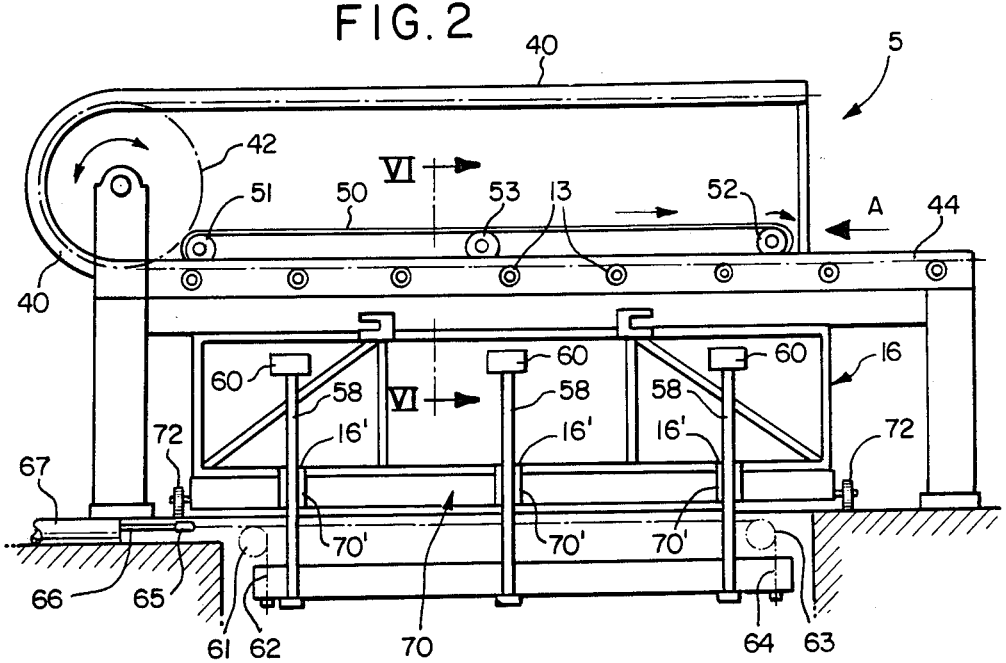
FIG. 2 is a simplified side elevational view of a stacking device according to the invention.
Figure 3:
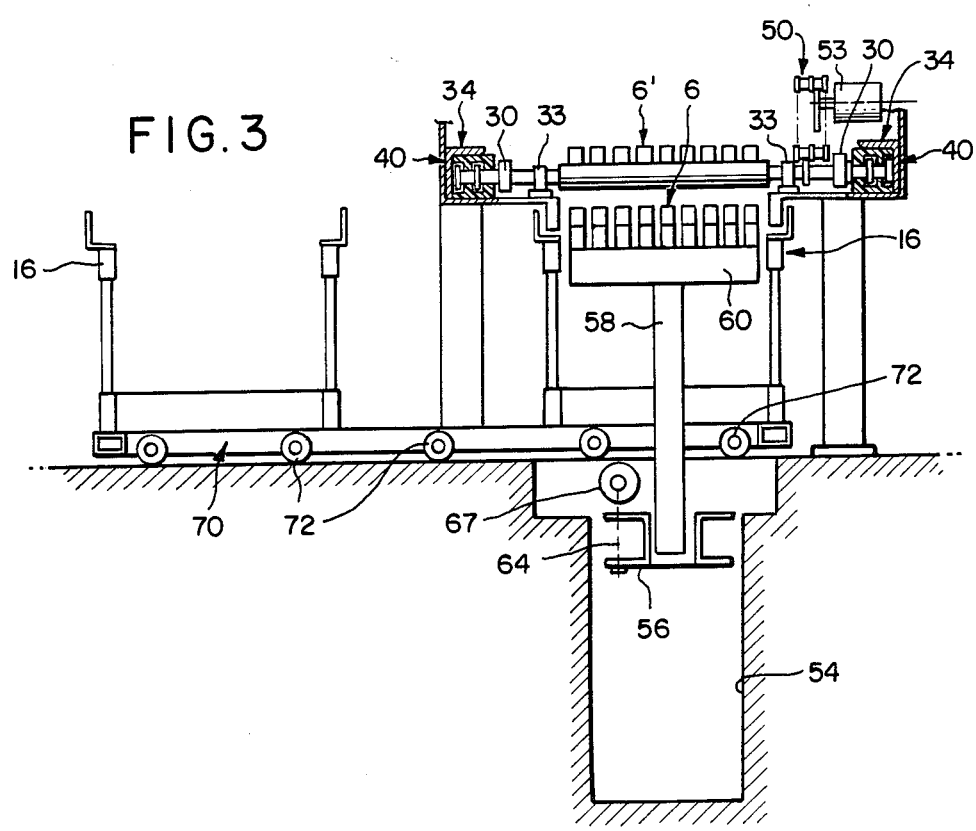
FIG. 3 is a sectional elevation along line VI—VI of FIG. 2 on an enlarged scale.
Figure 4:
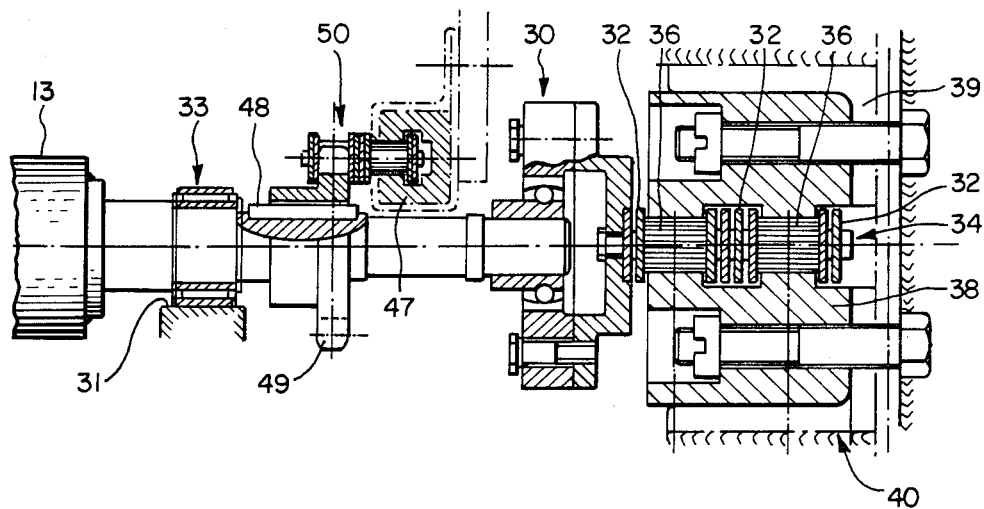
FIG. 4 is an enlarged partly sectioned view of a detail of FIG. 3 to illustrate specifically the roller arrangement and guidance as well as the drive means thereof.

FIGS. 2 to 4 illustrate details of a first embodiment of the stacking device located in the stacking section 5 and to be described in greater detail below.

The rollers 13 of the stacking section 5 roll along guideways 31 by means of needle bearings 33 and are supported for rotation in self-aligning ball bearings 30 at both ends. The ball bearings are connected to chain side bars 32 of two linear drive double roller chains 34, which are movable in the direction A of advance. Between the chain side bars 32 the chains 34 have rollers 36 by which they run on upper plane surfaces of horizontal plastic guide bars 38 which are fixed to the base 39 of a U-shaped guide means 40. As shown in FIG. 2, these guide means 40 are curved upwardly and backwards at the end of the stacking section 5, following the outer diameter of sprocket wheels 42 indicated by dash-dot lines. The guide means 40 cover such a length in backward direction that both chains 34 can be transported, with their entire length, into the upper section under the action of the sprocket wheels 42 so that also the rollers 13 are pulled away from under the conveying path of the goods.

In a conveying mode the rollers 13 are adapted to be driven in circumferential direction by a rotation drive double roller chain 50 shown in cross section in FIGS. 3 and 4 and in side elevation in FIG. 2. The rotation drive chain 50 passes around sprocket wheels 51, 52 and is driven by a motor 53 at its upper run (FIG. 2) which moves in opposite direction to the direction of advance A. The rollers of the lower run of the right-hand part of chain 50 (as seen in FIGS. 3 and 4) are rolling on the upper surface of a horizontal plastic guide bar 47 (FIG. 4). The lower run of the left-hand part of chain 50 engages a sprocket wheel 49 which is mounted at an end portion 29 of roller 13 rotatable therewith by means of key 48.

When the chains 34 are being transported, i.e. when the "loose roller carpet" made up of chains 34 and rollers 13 is pulled away from under the goods, the drive chains 50 are kept at rest so that at the contact points with the goods the local roller speed is zero. In other words, any sliding frictional forces acting between the rollers and the goods are avoided so that no sliding movement is transmitted from the rollers to the goods. Thus, the goods stay in place without any braking or retaining measures being required, and do not move forward or backward along the direction of transport when the loose roller carpet in a stacking mode is driven by chains 34 to be removed from stacking section 5 to permit the layer of goods 6' conveyed by the rollers 13 to sink down on the already stacked layer of goods 6.

An elongated recess 54 is provided below the stacking section 5. This recess takes up a longitudinal beam 56 composed of two U-shaped sectional bars disposed back to back and connected to each other. This longitudinal beam carries supports 58 which include transverse carriers 60 at their upper ends. The transverse carriers 60 are so dimensioned that they may pass through openings 16' formed in the bottom of the transportation frames or pallets 16. The transverse beam 56 is suspended by means of two chains 61, 64 passing around sprocket wheels 61, 63. The chains 62, 64 are attached by these sprocket wheels 61, 63 to a piston rod 66 of a horizontally positioned pressure fluid cylinder 67, as may be seen at 65.

Thus it may be seen that the support assembly including the supports 58 and the transverse carriers 60 is adapted to be raised and lowered in the recess 54 by operation of the pressure fluid cylinder, passing through the opening 16' of a pallet 16 located in stacking position above the recess 54, as shown in FIG. 3 and also in FIG. 2.

FIG. 3 shows not only the side board pallet 16 located in stacking position but also another empty pallet in waiting position to the left to the stacking section. Both pallets rest on a carriage 70 which is movable, for instance, by means of wheels 72 on rails extending transversely of the direction of advance A. The carriage 70 is formed in its bottom with openings 70' to permit passage of the transverse carriers 60 at the free ends of the support 58 which is adapted to be raised and lowered.

In FIG. 3, a position is shown at which the transverse carriers already carry two layers of elongated goods 6. As the "loose roller carpet" is pulled away from under the next layer designated 6' in FIG. 6, this next layer 6' is lowered on the top layer 6 of the stack of goods. Operation of the pressure fluid cylinder 67 will then lower the beam 56 by the height of one layer. This is repeated until the entire pallet disposed in stacking position has been filled. Thereupon the carriage 70 is moved to the right so that the empty pallet 16 shown at the left in FIG. 3 is moved into stacking position. Then the stacking process may begin again.

All processes described with reference to FIGS. 2 to 4 may be controlled fully automatically so that rapid, labor-saving stacking is permitted. In the same manner, however, the stacking may also be carried out by hand as already described with reference to FIG. 1, if this should be desired for any particular reason.

Figure 5:
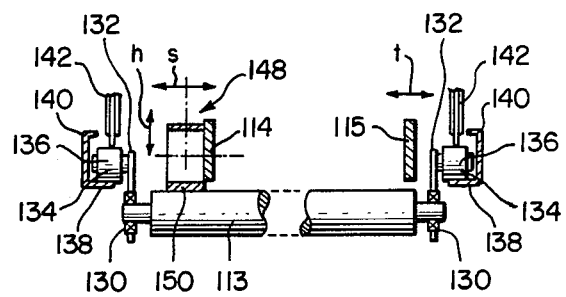
FIG. 5 is a sectional elevation similar to FIG. 3 of another embodiment of the roller drive means.

In the embodiment of FIG. 5 equal or similar parts are designated by similar reference numerals, which are formed by adding the numeral 100 to the corresponding reference numerals used in FIGS. 2 to 4.

The rollers 113 are adapted to be driven in circumferential direction by a belt drive whose drive belt 150 is indicated in cross section in FIG. 5. The upper run of the drive belt passing around rollers 151, 152 and driven by the same moves in opposite direction to the direction of advance A. Together with a side stop 114 the drive belt 150 is adjustable laterally in the direction of arrow s and vertically in the direction of arrow h, while the other side stop 115 is adjustable only laterally in the direction of arrow t. When the chains 134 are being driven, i.e. when the "loose roller carpet" made up of chains 134 and rollers 113 is pulled away from under the goods, the drive belts 150 are being stopped so that a circumferential speed of zero value is imparted to the rollers 113 where they contact the goods. Consequently the goods stay in place without any braking or retaining measures being required.

Figure 6:
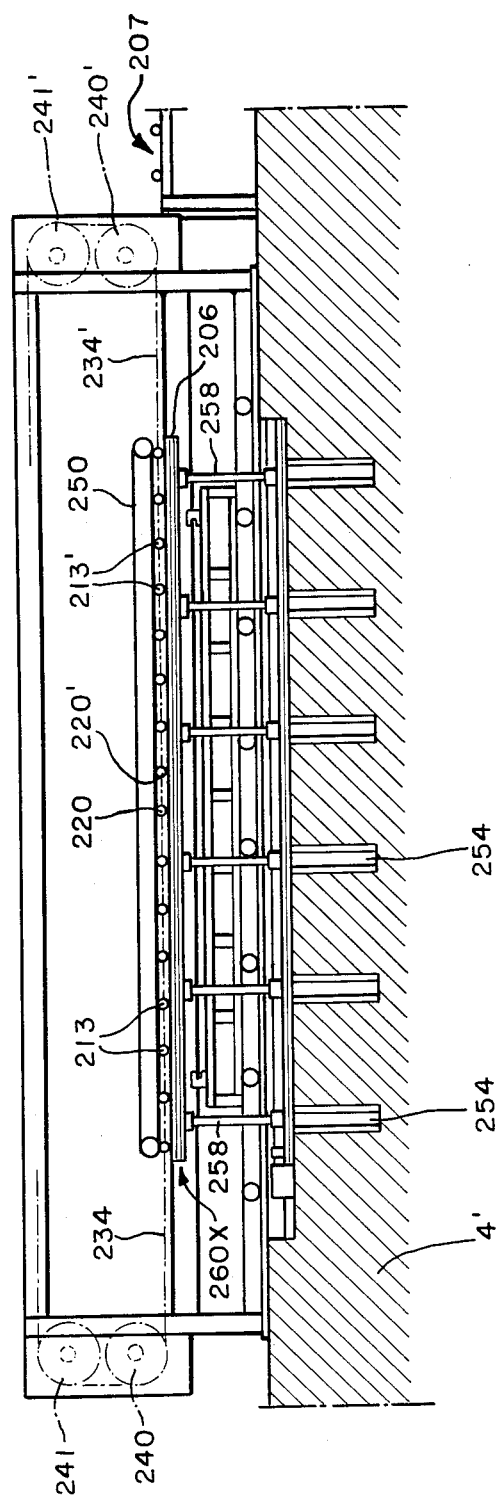
FIG. 6 is a partially sectional side view of still another embodiment of the invention.

In the embodiments shown in FIG. 6 similar reference numerals as in FIGS. 1 to 4 are used for the same or similar parts and are formed by adding the numeral 200 to the corresponding numerals in FIGS. 1 to 4.

The stacker shown in FIG. 6 comprises a stacking table 260 including a total of six lifting supports 258 arranged in parallel, which are adapted to be synchronously lowered into recesses 254 provided in the base by means of a drive system (not illustrated) with increasing thickness of the stack 206 to be formed of elongate material such as cut aluminium sections.

Above the stack 206, two loose roller carpets comprising two sets of rollers 213, 213' are provided as an extension of a roller conveyor 207 alnng which the goods to be stacked are delivered. The two roller carpets are adapted to be synchronously pulled apart from the illustrated central position, in which their heads 220, 220' substantially abut each other, in opposite directions so that the stacking table 260 will be cleared from any rollers 213, 213' and exposed to the goods conveyed by the rollers. This is necessary so that a layer of goods advanced by means of the rollers 213, 213' may be lowered onto the stack of goods 206 therebelow. The roller carpets each comprise two parallel chains 234, 234' on either side with the rollers 213, 213' disposed therebetween, which are adapted to be jointly rotated via a single rotation drive chain 250 common to both sets of rollers 213 and 213' and apart from that similar in construction and function to chain 50 (FIG. 4). When pulling-apart of each roller carpet, the drive chain 250 is kept at rest such that the rollers 213, 213' of both roller sets are rolling without sliding along the goods and thereby the goods positioned thereon will not be moved in conveying direction but will rest above the stacking table 260.

When the roller carpets are pulled away, they are removed from the stacking surface along the path indicated in dashed lines by means of respective guide sprocket wheels 240, 241, 240', 241', of which a respective one is driven, and subsequently the roller carpets are returned to the position indicated in FIG. 6.

By using two "loose roller carpets" as described above the time for lowering a layer of goods onto a stack may be halved.

What is claimed is:

1. A stacking device for rigid elongated goods, such as metal bars, pipes, and sectional materials, comprising a stacking section which extends in the conveying direction of the goods and includes rollers for conveying the goods in the stacking section, said rollers being arranged so that their axes extend horizontally and transversely underneath the goods for supporting the goods and said rollers adapted to be driven for linear movement selectively in and opposite to the conveying direction of the goods by means of linear drive means, wherein the linear drive means are formed by first and second parallel linear drive chains, said rollers being rotatably supported with one end of each roller at the first chain and with the other end of each roller at the second chain, such that all the rollers may be removed from the stacking section, and support means adapted to be raised and lowered arranged under the stacking section such that when said rollers are removed from the stacking section said goods are transferred onto said support means, wherein the rollers are driven by rotation drive means at their peripheries such that during the conveying operation of the rollers the linear drive means are not actuated, the roller axes are kept at rest, and the rollers are rotated about their axes by the rotation drive means in order to convey the goods onto the stacking section, and wherein during the stacking operation the rollers are linearly driven by the linear drive means while the rotation drive means are kept at rest such that th rollers freely roll along a rolling path formed by the rotation drive means, while the rollers are removed from the stacking section, and thereby permit the stacking of the goods conveyed.

2. The stacking device of claim 1, wherein two aligned sets of rollers are provided, each being removable from the stacking section by a corresponding linear drive chain which moves in synchronism with and in a direction opposite to the other linear drive chain.

3. The stacking device of claim 2 wherein wherein one rotation drive means is provided for both sets of rollers, said rotation drive means being actuated during the conveying operation for conveying said goods onto the stacking section, and said rotation drive means being kept at rest during the stacking operation when the linear drive means are actuated to remove the rollers from the stacking section.

4. A stacking device for rigid elongated goods, such as metal bars, pipes, and sectional materials, comprising a stacking section which extends in the conveying direction of the goods and includes rollers for conveying the goods in the stacking section, said rollers being arranged so that their axes extend horizontally and tranversely underneath the goods for supporting the goods and said being rollers adapted to be driven for linear movement selectively in and opposite to the conveying direction of the goods by means of linear drive means, wherein the linear drive means are formed by first and second parallel linear drive chains, said rollers being rotatably supported with one end of each roller at the first chain and with the other end of each roller at the second chain, such that all the rollers may be removed from the stacking section, and support means adapted to be raised and lowered arranged under the stacking section such that when said rollers are removed from the stacking section said goods are transferred onto said support means and, wherein two aligned sets of rollers are provided, each being removable from the stacking section by a corresponding linear drive chain which moves in synchronism with and in a direction opposite to the other linear drive chain.

5. The stacking device of claim 4, wherein one rotation drive means is provided for both sets of rollers, said rotation drive means being actuated during the conveying operation for conveying said goods onto the stacking section, and said rotation drive means being kept at rest during the stacking operation when the linear drive means are actuated to remove the rollers from the stacking section.

* * * * *